US006958920B2

(12) United States Patent
Mednik et al.

(10) Patent No.: US 6,958,920 B2
(45) Date of Patent: Oct. 25, 2005

(54) SWITCHING POWER CONVERTER AND METHOD OF CONTROLLING OUTPUT VOLTAGE THEREOF USING PREDICTIVE SENSING OF MAGNETIC FLUX

(75) Inventors: Alexander Mednik, Campbell, CA (US); David Chalmers Schie, Cupertino, CA (US); James Hung Nguyen, San Jose, CA (US); Wei Gu, San Jose, CA (US)

(73) Assignee: Supertex, Inc., Sunnyvale, CA (US)

( * ) Notice: Subject to any disclaimer, the term of this patent is extended or adjusted under 35 U.S.C. 154(b) by 0 days.

(21) Appl. No.: 10/838,820

(22) Filed: May 4, 2004

(65) Prior Publication Data

US 2005/0073862 A1 Apr. 7, 2005

Related U.S. Application Data

(63) Continuation-in-part of application No. 10/677,439, filed on Oct. 2, 2003, now abandoned.

(60) Provisional application No. 60/534,515, filed on Jan. 6, 2004.

(51) Int. Cl.[7] .............................................. H02M 3/335
(52) U.S. Cl. .................. 363/19; 363/21.01; 363/21.18; 323/285
(58) Field of Search .............................. 363/93, 18, 19, 363/20, 21.01, 21.03, 21.11, 21.16, 21.17, 363/21.18; 323/266, 285, 284

(56) References Cited

U.S. PATENT DOCUMENTS 5,612,862 A * 3/1997 Marusik et al. ............... 363/93
6,069,803 A * 5/2000 Cross ...................... 363/21.14
6,249,444 B1 * 6/2001 Cross ...................... 363/21.03

* cited by examiner

*Primary Examiner*—Jessica Han
(74) *Attorney, Agent, or Firm*—A. Mitchell Harris; Jeffrey D. Moy; Weiss, Moy & Harris, P.C.

(57) ABSTRACT

A switching power converter and method of controlling an output voltage thereof using predictive sensing of magnetic flux provides a low-cost switching power converter via primary-side control using a primary-side winding. An integrator generates a voltage that represents flux within a magnetic element by integrating a primary-side winding voltage. A detection circuit detects the end of a half-cycle of post-conduction resonance that occurs in the power magnetic element subsequent to zero energy level in the power magnetic element. The integrator voltage is stored at the end of the half-cycle and is used to determine a sampling point prior to or equal to the start of post-conduction resonance in a subsequent switching cycle of the power converter. The primary-side winding voltage is then sampled at the sampling point, providing an indication of the output voltage of the power converter by which the output voltage of the converter can be controlled.

31 Claims, 8 Drawing Sheets

SWITCHING POWER CONVERTER AND METHOD OF CONTROLLING OUTPUT VOLTAGE THEREOF USING PREDICTIVE SENSING OF MAGNETIC FLUX

CROSS-REFERENCE TO RELATED APPLICATION

This application is a Continuation-In-Part of U.S. patent application Ser. No. 10/677,439, filed Oct. 2, 2003 now abandoned and from which it claims benefits under 35 U.S.C. §120. This application also claims the benefit of priority under 35 U.S.C. §119(e) of U.S. Provisional Application Ser. No. 60/534,515 filed Jan. 6, 2004.

BACKGROUND OF THE INVENTION

1. Field of the Invention

The present invention relates generally to power supplies, and more specifically to a method and apparatus for controlling a switching power converter entirely from the primary side of the power converter by predictive sensing of magnetic flux in a magnetic element.

2. Background of the Invention

Electronic devices typically incorporate low voltage DC power supplies to operate internal circuitry by providing a constant output voltage from a wide variety of input sources. Switching power converters are in common use to provide a voltage regulated source of power, from battery, AC line and other sources such as automotive power systems.

Power converters operating from an AC line source (offline converters) typically require isolation between input and output in order to provide for the safety of users of electronic equipment in which the power supply is included or to which the power supply is connected. Transformer-coupled switching power converters are typically employed for this function. Regulation in a transformer-coupled power converter is typically provided by an isolated feedback path that couples a sensed representation of an output voltage from the output of the power converter to the primary side, where an input voltage (rectified line voltage for AC offline converters) is typically switched through a primary-side transformer winding by a pulse-width-modulator (PWM) controlled switch. The duty ratio of the switch is controlled in conformity with the sensed output voltage, providing regulation of the power converter output.

The isolated feedback signal provided from the secondary side of an offline converter is typically provided by an optoisolator or other circuit such as a signal transformer and chopper circuit. The feedback circuit typically raises the cost and size of a power converter significantly and also lowers reliability and long-term stability, as optocouplers change characteristics with age.

An alternative feedback circuit is used in flyback power converters in accordance with an embodiment of the present invention. A sense winding in the power transformer provides an indication of the secondary winding voltage during conduction of the secondary side rectifier, which is ideally equal to the forward drop of the rectifier added to the output voltage of the power converter. The voltage at the sense winding is equal to the secondary winding voltage multiplied by the turns ratio between the sense winding and the secondary winding. A primary power winding may be used as a sense winding, but due to the high voltages typically present at the power winding, deriving a feedback signal from the primary winding may raise the cost and complexity of the feedback circuit. An additional low voltage auxiliary winding that may also be used to provide power for the control and feedback circuits may therefore be employed. The above-described technique is known as "magnetic flux sensing" because the voltage present at the sense winding is generated by the magnetic flux linkage between the secondary winding and the sense winding.

Magnetic flux sensing lowers the cost of a power supply by reducing the number of components required, while still providing isolation between the secondary and primary sides of the converter. However, parasitic phenomena typically associated with magnetically coupled circuits cause error in the feedback signal that degrade voltage regulation performance. The above-mentioned parasitics include the DC resistance of windings and switching elements, equivalent series resistance (ESR) of filter capacitors, leakage inductance and non-linearity of the power transformer and the output rectifier.

Solutions have been provided in the prior art that reduce the effect of some of the above-listed parasitics. For example, adding coupled inductors in series with the windings or a leakage-spike blanking technique reduce the effect of leakage inductance in flyback voltage regulators. Other techniques such as adding dependence on the peak primary current (sensed switch current) to cancel the effect of the output load on sensed output voltage have been used. However, the on-resistance of switches typically vary greatly from device to device and over temperature and the winding resistances of both the primary and secondary winding also vary greatly over temperature. The equivalent series resistance (ESR) of the power converter output capacitors also varies greatly over temperature. All of the above parasitic phenomena reduce the accuracy of the above-described compensation scheme.

In a discontinuous conduction mode (DCM) flyback power converter, in which magnetic energy storage in the transformer is fully depleted every switching cycle, accuracy of magnetic flux sensing can be greatly improved by sensing the voltage at a constant small value of magnetization current while the secondary rectifier is still conducting. However, no prior art solution exists that provides a reliable and universal method that adapts to the values of the above-mentioned parasitic phenomena in order to accurately sense the voltage at the above-mentioned small constant magnetization current point in DCM power converters.

Therefore, it would be desirable to provide a method and apparatus for controlling a power converter output entirely from the primary, so that isolation bridging is not required and having improved immunity from the effects of parasitic phenomena on the accuracy of the power converter output.

SUMMARY OF THE INVENTION

The above objective of controlling a switching power converter output entirely from the primary side with improved immunity from parasitic phenomena is achieved in a switching power converter apparatus and method. The power converter includes an integrator that generate a voltage corresponding to magnetic flux within a power magnetic element of the power converter. The integrator is coupled to a winding of the power magnetic element and integrates the voltage of the winding. A detection circuit detects an end of a half-cycle of post-conduction resonance that occurs in the power magnetic element subsequent to the energy level in the power magnetic falling to zero. The voltage of the integrator is stored at the end of a first post-conduction resonance half-cycle and is used to determine a sampling time prior to or equal to the start of a post-conduction resonance in a subsequent switching cycle of the power converter. At the sampling time, the auxiliary winding voltage is sampled and used to control a switch that energizes the power magnetic element.

The foregoing and other objectives, features, and advantages of the invention will be apparent from the following, more particular, description of the preferred embodiment of the invention, as illustrated in the accompanying drawings, wherein like reference numerals indicate like components throughout.

DETAILED DESCRIPTION OF THE EMBODIMENTS

The present invention provides novel circuits and methods for controlling a power supply output voltage using predictive sensing of magnetic flux. As a result, the line and load regulation of a switching power converter can be improved by incorporating one or more aspects of the present invention. The present invention includes, alone or in combination, a unique sampling error amplifier with zero magnetization detection circuitry and unique pulse width modulator control circuits.

Figure 1:
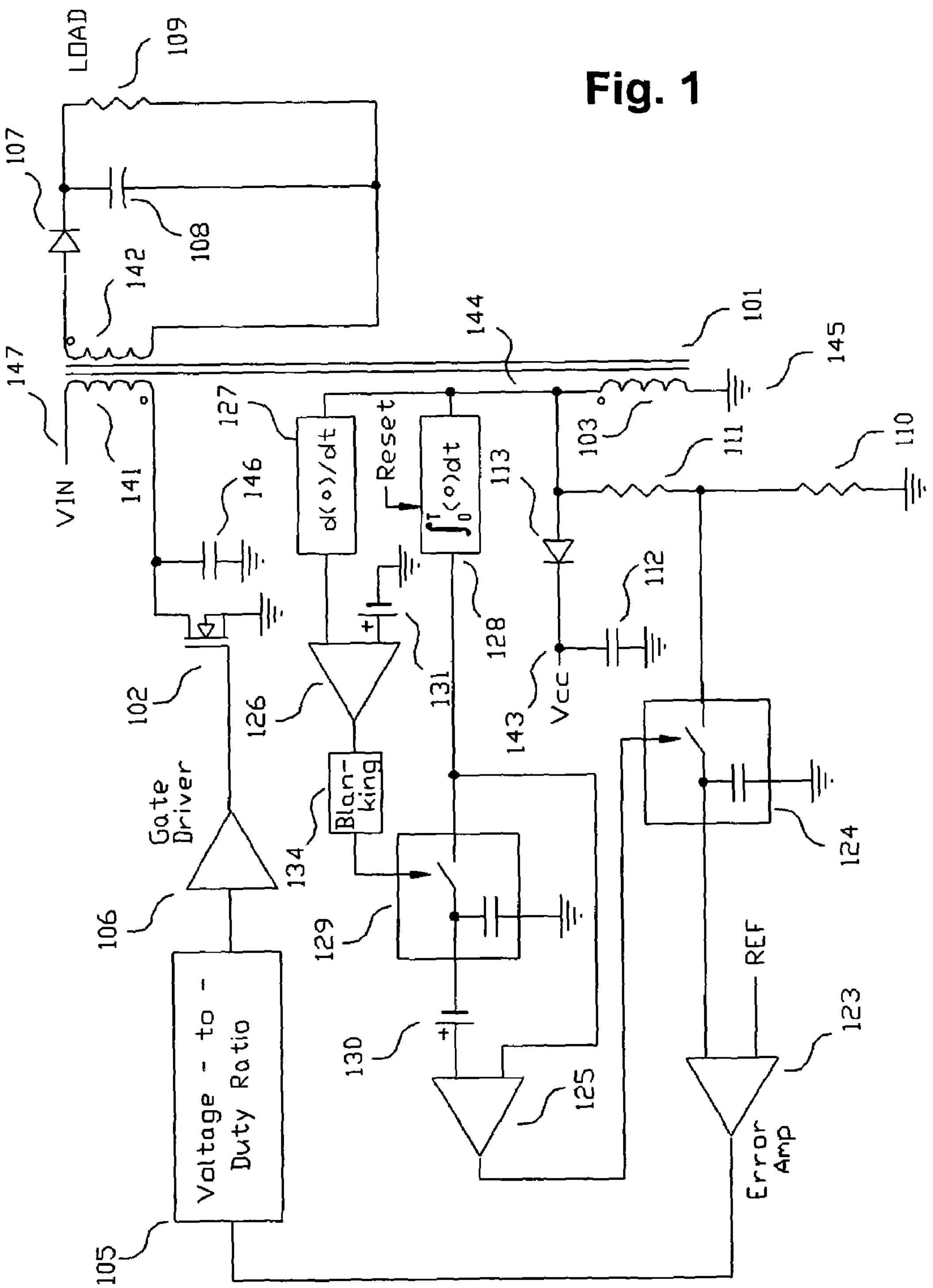
FIG. 1 is a schematic diagram of a power converter in accordance with an embodiment of the present invention.

FIG. 1 shows a simplified block diagram of a first embodiment of the present invention. The switching configuration shown is a flyback converter topology. It includes a transformer 101 with a primary winding 141, a secondary winding 142, an auxiliary winding 103, a secondary rectifier 107 and a smoothing capacitor 108. A resistor 109 represents an output load of the flyback converter. A capacitor 146 represents total parasitic capacitance present at an input terminal of primary winding 141, including the output capacitance of the switch 102, inter-winding capacitance of the transformer 101 and other parasitics. Capacitance may be added in the form of additional discrete capacitors if needed in particular implementations for lowering the frequency of the post-conduction resonance condition. The power converter of FIG. 3 also includes an input terminal 147, a supply voltage terminal 143 which is a voltage derived from auxiliary winding 103 by means of a rectifier 113 and a smoothing capacitor 112, a feedback terminal 144, and a ground terminal 145. Voltage VIN at the input terminal 147 is an unregulated or poorly regulated DC voltage, such as one generated by the input rectifier circuitry of an offline power supply. The power converter also includes a power switch 102 for switching current through the primary winding 141 from input terminal 147 to ground terminal 145, a sample-and-hold circuit 124 connected to feedback terminal 144 via a resistive voltage divider formed by resistors 110 and 111, an error amplifier circuit 123 having one of a pair of differential inputs connected to an output of sample-and-hold circuit 124 and having another differential input connected to a reference voltage REF, a pulse width modulator circuit 105 that generates a pulsed signal having a duty ratio as a function of an output signal of error amplifier circuit 123, a gate driver 106 for controlling on and off states of power switch 102 in accordance with the output of the pulse width modulator circuit 105, an integrator circuit 128 having an input connected to feedback terminal 144 and a reset input, a differentiator circuit 127 having an input connected to feedback terminal 144, a zero-derivative detect comparator 126 having a small hysteresis and having one of a pair or differential inputs connected to the output of differentiator circuit 127, and another differential input connected to an offset voltage source 131, a blanking circuit 134 for selectively blanking the zero-derivative detect comparator 126 output, a sample-and-hold circuit 129 controlled by the output signal of the comparator 126 via the blanking circuit 134 for selective sampling-and-holding the output signal of the integrator circuit 128; a comparator 125 having one of a pair of differential inputs connected to the output of sample-and-hold circuit 129 and offset by a voltage source 130, and another differential input connected to the output of integrator circuit 128. The output of comparator 125 controls the sample-and-hold circuit 124.

Figure 1B:
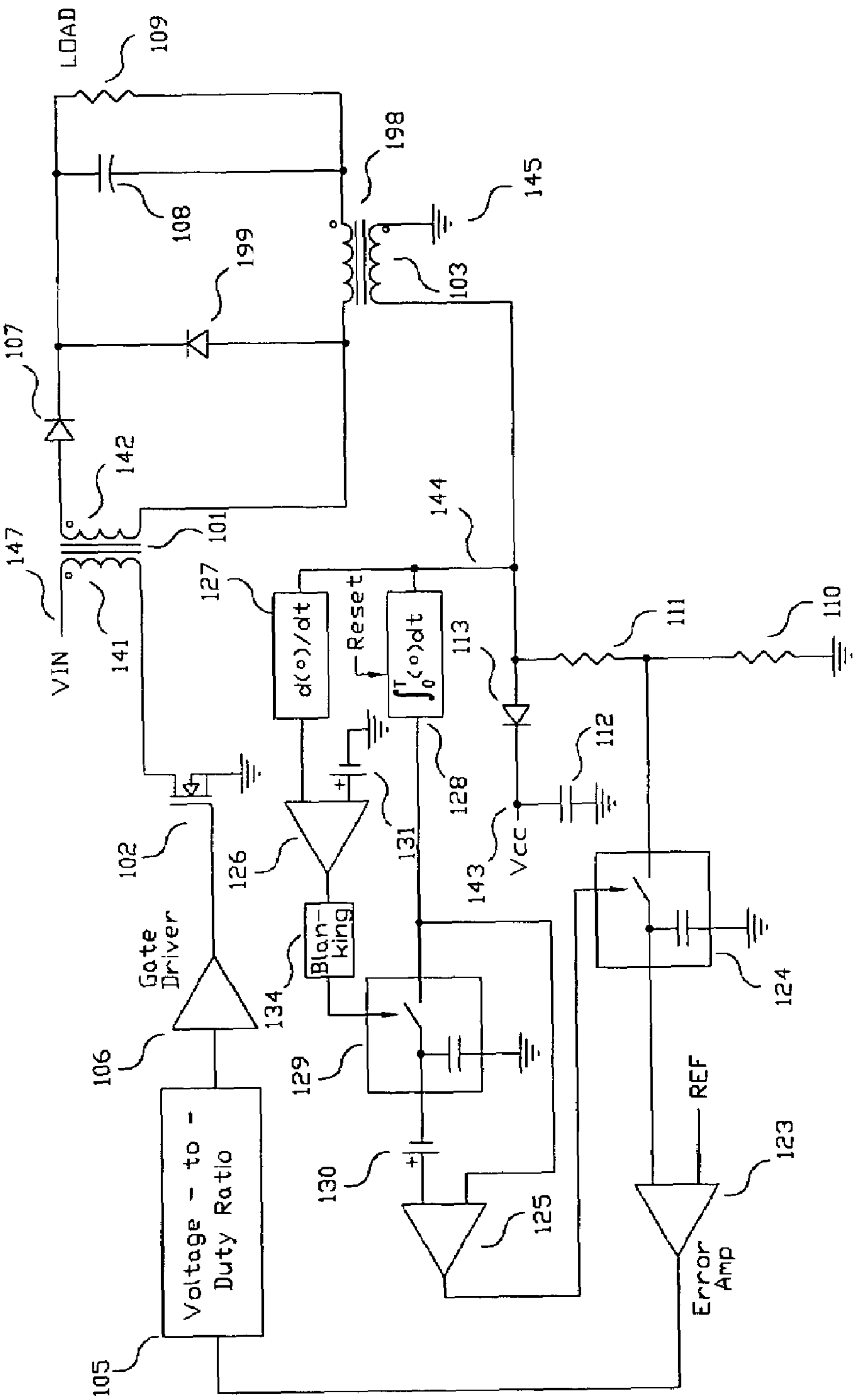
FIG. 1B is a schematic diagram of a power converter in accordance with an alternative embodiment of the present invention.

Referring now to FIG. 1B, a forward power converter in accordance with an alternative embodiment of the present invention is depicted. Rather than auxiliary winding 103 being provided as a transformer winding, in the present embodiment, the feedback signal is provided by auxiliary winding 103 of an output filter inductor 145. A free-wheeling diode 199 is added to the circuit to return energy from a power winding 198 of output filter inductor 145, to capacitor 108 and load 109. When switch 102 is enabled, a secondary voltage of positive polarity appears across winding 142 equal to input voltage VIN divided by turn ratio between windings 141 and 142. Diode 107 conducts, coupling the power winding of inductor 198 between winding 142 and filter capacitor 108. Energy is thereby stored in inductor 198. When switch 102 is disabled, diode 107 becomes reverse biased, and diode 199 conducts, returning energy stored in inductor 198 to output filter capacitor 108 and load 109. When the magnetic energy stored in inductor 198 fully depleted, inductor 198 enters post-conduction resonance (similar to that of transformer 101 in the circuit of FIG. 1). Therefore, auxiliary winding 103 provides similar waveforms as the circuit of FIG. 1 and provides a similar voltage feedback signal that are used by the control circuit of the present invention.

Figure 2:
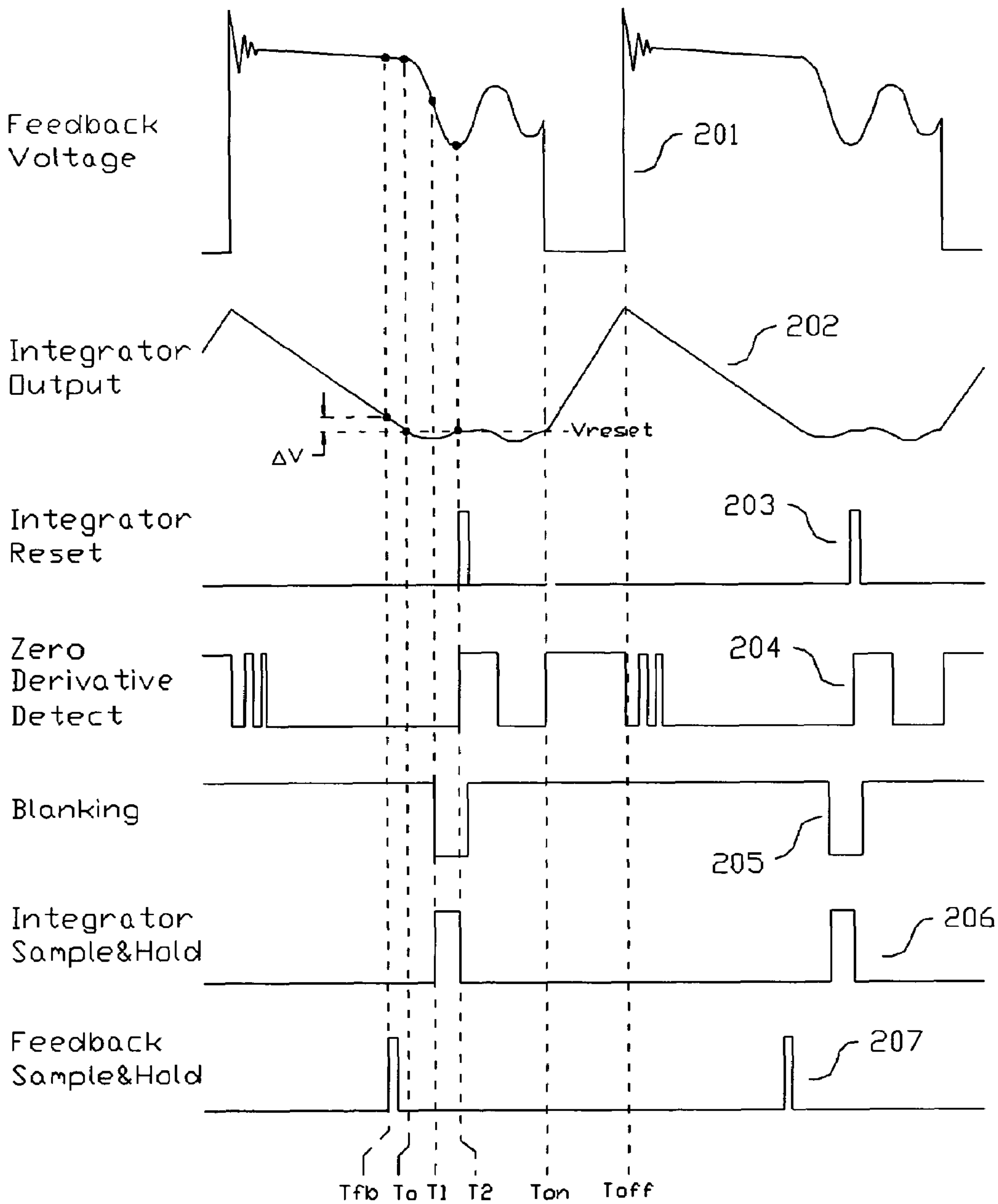
FIG. 2 is a waveform diagram depicting signals within the power converters of FIGS. 1 and 1B.

Operation of the circuits of FIGS. 1 and 1B is depicted in the waveform diagram of FIG. 2, respecting the difference that auxiliary winding 103 of FIG. 1B is provided on output filter inductor 198. Referring additionally to FIG. 2, at time Ton, power switch 102 is turned on. During the period of time between Ton and Toff, a linear increase of the magnetization current in primary winding 141 of flyback transformer 101 occurs. A voltage 201 of negative polarity and proportional to the input voltage VIN as determined by the turns ratio between auxiliary winding 103 and primary winding 141 will appear at feedback terminal 144. (In the circuit of FIG. 1B, the feedback voltage is proportional to the difference between VIN divided by the turn ratio between windings 141 and 142 and the output voltage across capacitor 108.) The feedback terminal 144 voltage causes a linear increase in the output voltage 202 of integrator 128. The duration of the on-time of the power switch 102 is determined by the magnitude of the error signal at the output of error amplifier 123.

At time Toff, power switch 102 is turned off, interrupting the magnetization current path of primary winding 141 (or the power winding of inductor 198 in the circuit of FIG. 1B). Secondary rectifier 107 (or diode 199 in the circuit of FIG. 1B) then becomes forward biased and conducts the magnetization current of secondary winding 142 (or the power winding of inductor 198 in the circuit of FIG. 1B) to output smoothing capacitor 108 and load 109. The magnetization current decreases linearly as the flyback transformer 101 (or inductor 198 in the circuit of FIG. 1B) transfers energy to output capacitor 108 and load 109. A positive voltage 201 is then present at feedback terminal 144 (and similarly for the circuit of FIG. 1B after diode 107 ceases conduction and diode 199 conducts), having a voltage proportional to the sum of the output voltage across capacitor 108 and the forward voltage of rectifier 107 (or diode 199 in the circuit of FIG. 1B) and the proportion is determined by the turn ratio between auxiliary winding 103 and secondary winding 142 (or power winding 198 in the circuit of FIG. 1B). The feedback terminal 144 voltage causes the output voltage of integrator 128 to decrease linearly until, at time To, transformer 101 (or output filter inductor 198 in the circuit of FIG. 1B) is fully de-energized. At time To, rectifier 107 (or diode 199 in the circuit of FIG. 1B) becomes reverse biased, and the voltage across the windings of the transformer 101 (or inductor 198 in the circuit of FIG. 1B) reflects a post-conduction resonance condition as shown.

The period of the post-conduction resonance is a function of the inductance of primary winding 141 and parasitic capacitance 146 (or the parasitic capacitance as reflected at the power winding of filter inductor 198 in the circuit of FIG. 1B). Differentiator circuit 127 continuously generates an output corresponding to the derivative of voltage 201 at feedback terminal 144. The output of differentiator 127 is compared to a small reference voltage 131 by comparator 126, in order to detect a zero-derivative condition at feedback terminal 144. Comparator 126 provides a hysteresis to eliminate its false tripping due to noise at the feedback terminal 144. Output voltage 202 of integrator 128 is sampled at time T2, when comparator 126 detects the zero-derivative condition at feedback terminal 144 (positive edge of comparator 126 output 204). Blanking circuit 134 disables the output of comparator 126, only enabling sample-and-hold circuit 129 during post-conduction resonance. The blanking signal is represented by a waveform 205 and the output of blanking circuit 134 is represented by a waveform 206.

There are numerous ways to generate blanking waveform 205. In the illustrative example, sampling is enabled at time T1 when the voltage at the feedback terminal 144 reaches substantially zero. The voltage at the output of sample-and-hold circuit 129 is offset by a small voltage 130 (ΔV of FIG. 2). During the next switching cycle, the previously sampled (held) voltage is compared to the output voltage of integrator 128 by comparator 125. Comparator 125 triggers sample-and-hold circuit 124, which samples the feedback voltage at the output of the resistive divider formed by resistors 110, 111 at time Tfb. Waveform 207 shows the timing of feedback voltage sampling by sample-and-hold circuit 124. The sampled feedback voltage is compared to reference voltage REF by error amplifier 123, which outputs an error signal that controls pulse width modulator circuit 105.

Every switching cycle, the output of integrator 128 is reset to a constant voltage level Vreset by a reset pulse 203 in order to remove integration errors. It is convenient to reset integrator 128 following time T2. However, in general, integrator 128 can be reset at any time with the exceptions of times Tfb and T1 which are sampling times.

Since flyback transformer 101 (and inductor 198 in the circuit of FIG. 1B) is fully de-energized every switching cycle, the output of integrator 128 represents a voltage analog of the magnetization current in the transformer 101 (and magnetization current of filter inductor 198 in the circuit of FIG. 1B). Time To corresponds a point of zero magnetization current. Voltage offset ΔV sets a constant small from the actual secondary winding 142 zero-current point, and this a small offset in sampling time Tfb, at which the voltage at feedback terminal 144 is sampled. The technique described above eliminates the effect of most of the parasitic elements of the power supply, and substantial improvement of regulation of output voltage of the switching power converter is achieved.

Figure 3:
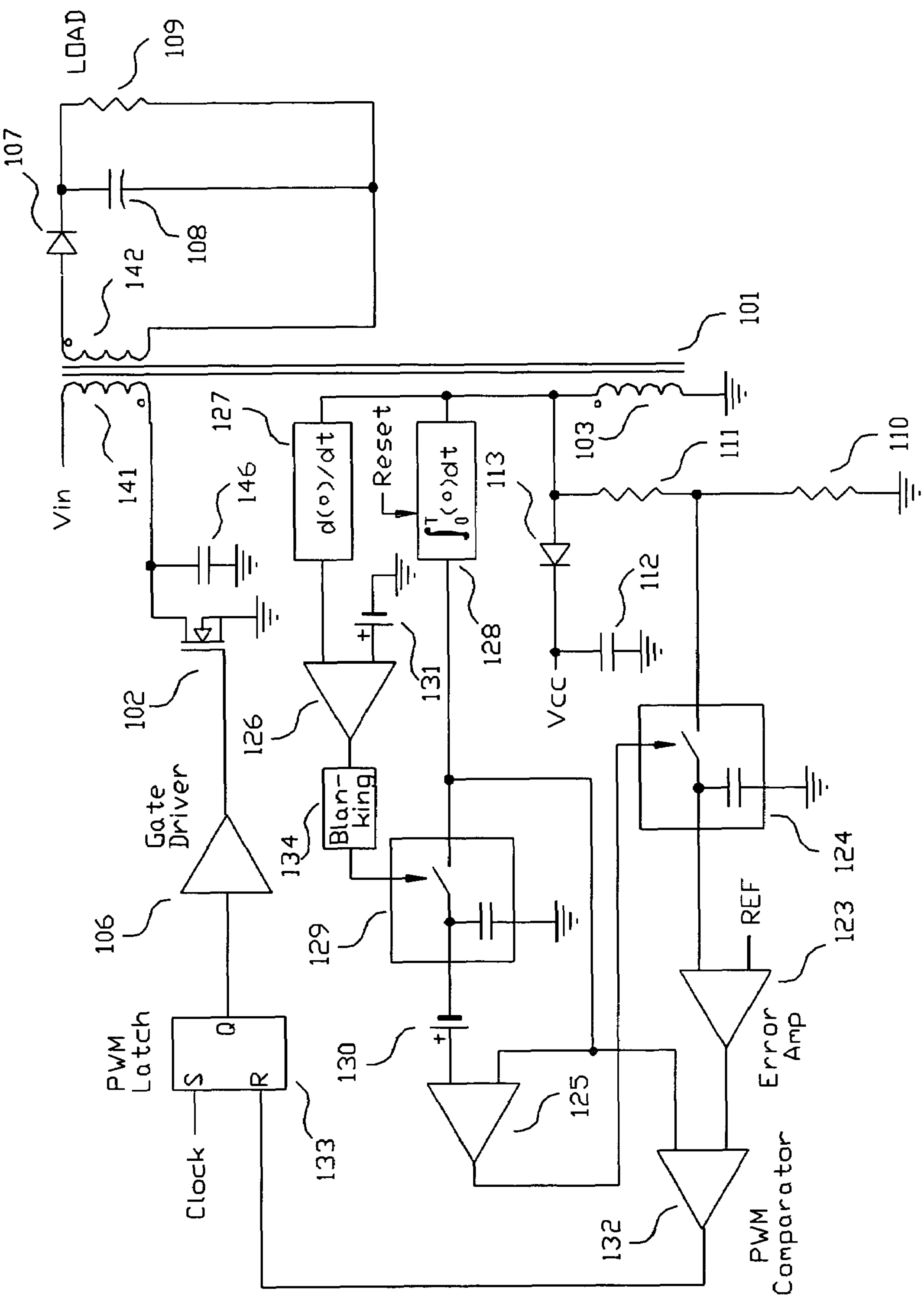
FIG. 3 is a schematic diagram of a power converter in accordance with another embodiment of the present invention.

A method and apparatus in accordance with an alternative embodiment of the present invention are included in traditional peak current mode controlled pulse width modulator circuit to form a circuit as depicted in FIG. 3, wherein like reference designators are used to indicate like elements between the circuit of FIGS. 1 and 3. Only differences between the circuits of FIGS. 1 and 3 will be described below.

Referring to FIG. 3, since the output voltage of the integrator 128 is a representation of the magnetic flux in transformer 101, integrator 128 output is an indication of current conducted through power switch 102. Pulse width modulator circuit includes a pulse width modulator comparator 132 and a latch circuit 133. In operation, when the output voltage of integrator 128 the output voltage of error amplifier 123, comparator 132 resets latch 133 and turns off power switch 102. Latch 133 is set with a fixed frequency Clock signal at the beginning of the next switching cycle, initiating the next turn-on of the switch 102.

Figure 4:
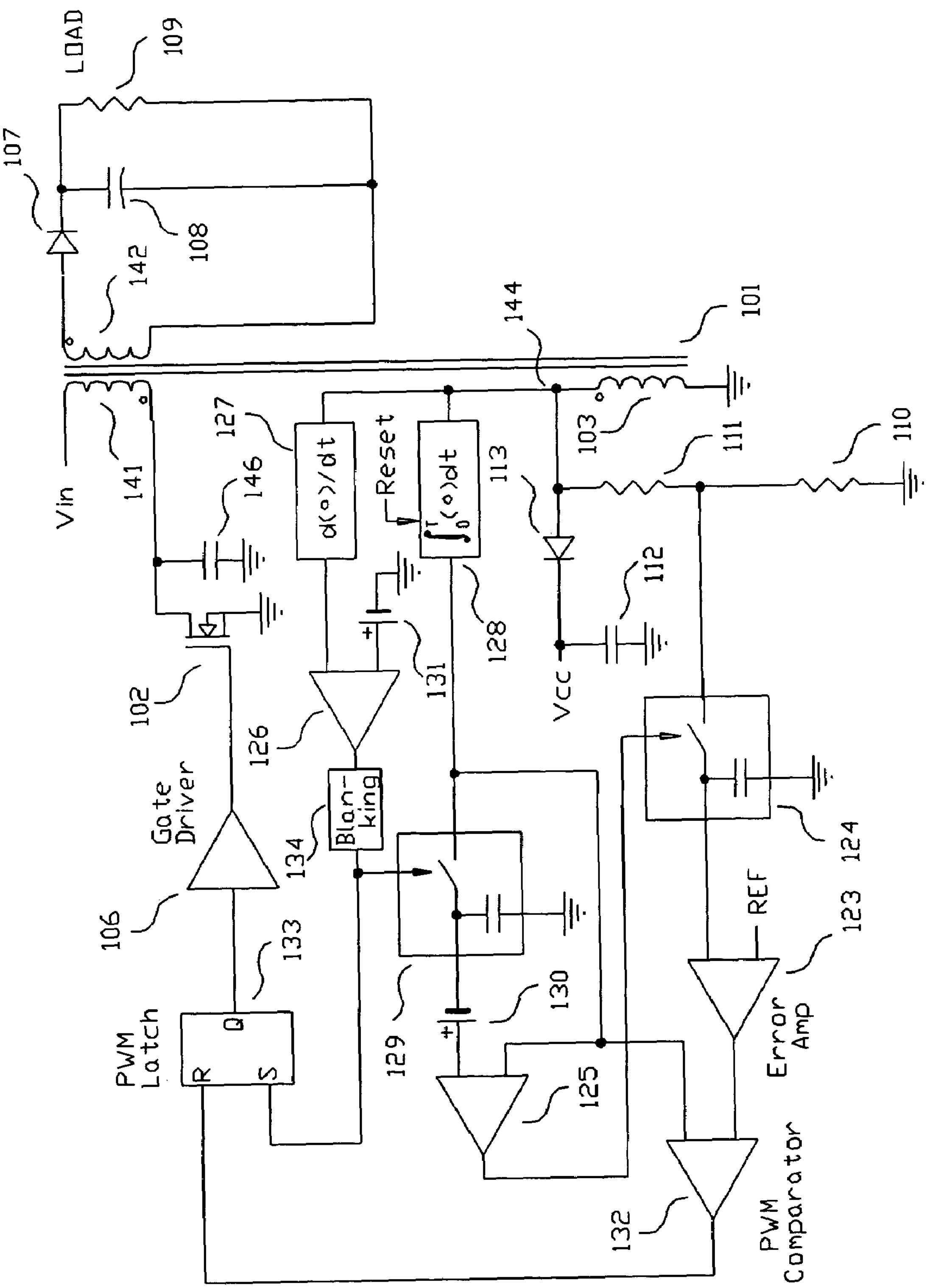
FIG. 4 is a schematic diagram of a power converter in accordance with yet another embodiment of the present invention.
Figure 5:
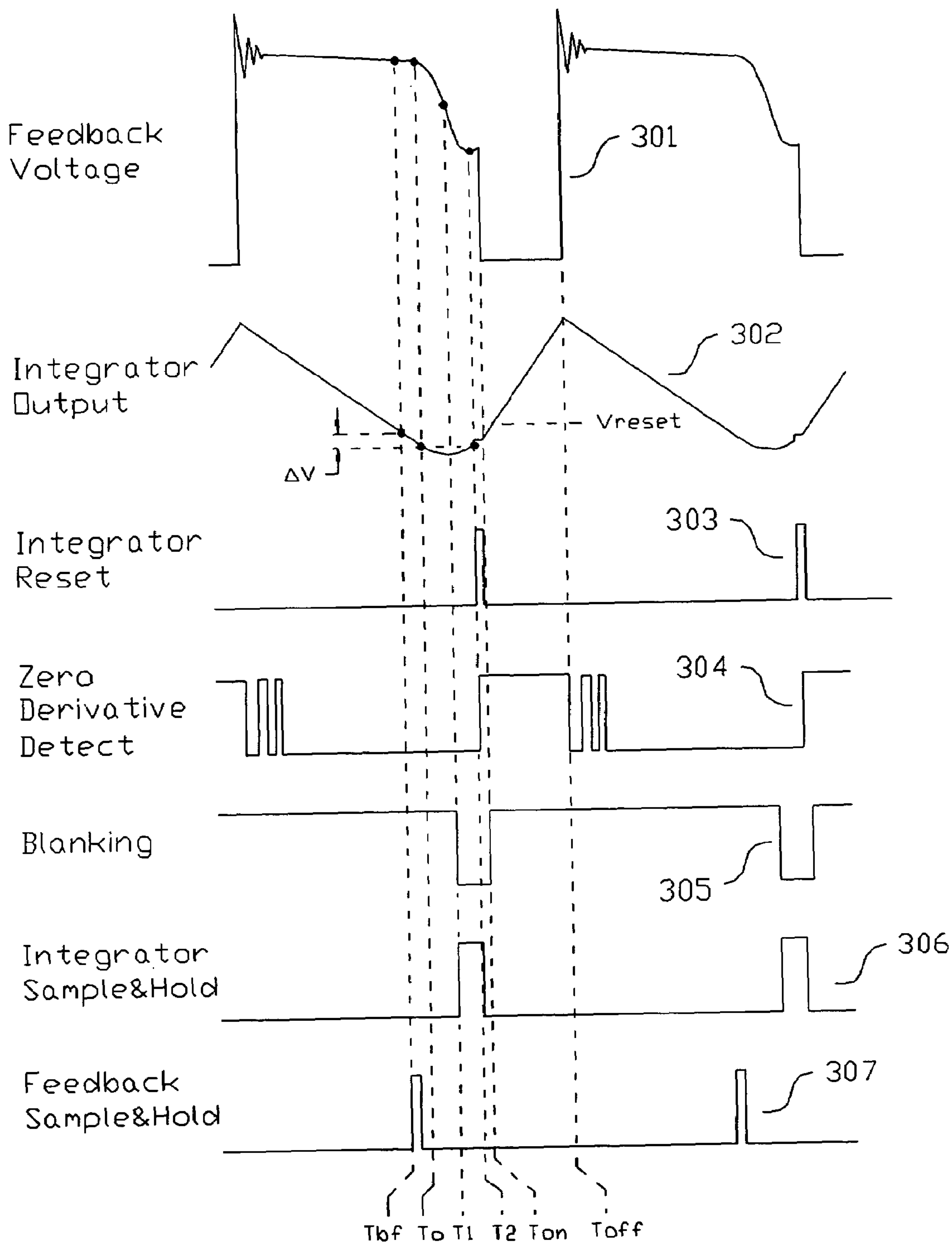
FIG. 5 is a waveform diagram depicting signals within the power converters of FIGS. 3 and 4.
Figure 6:
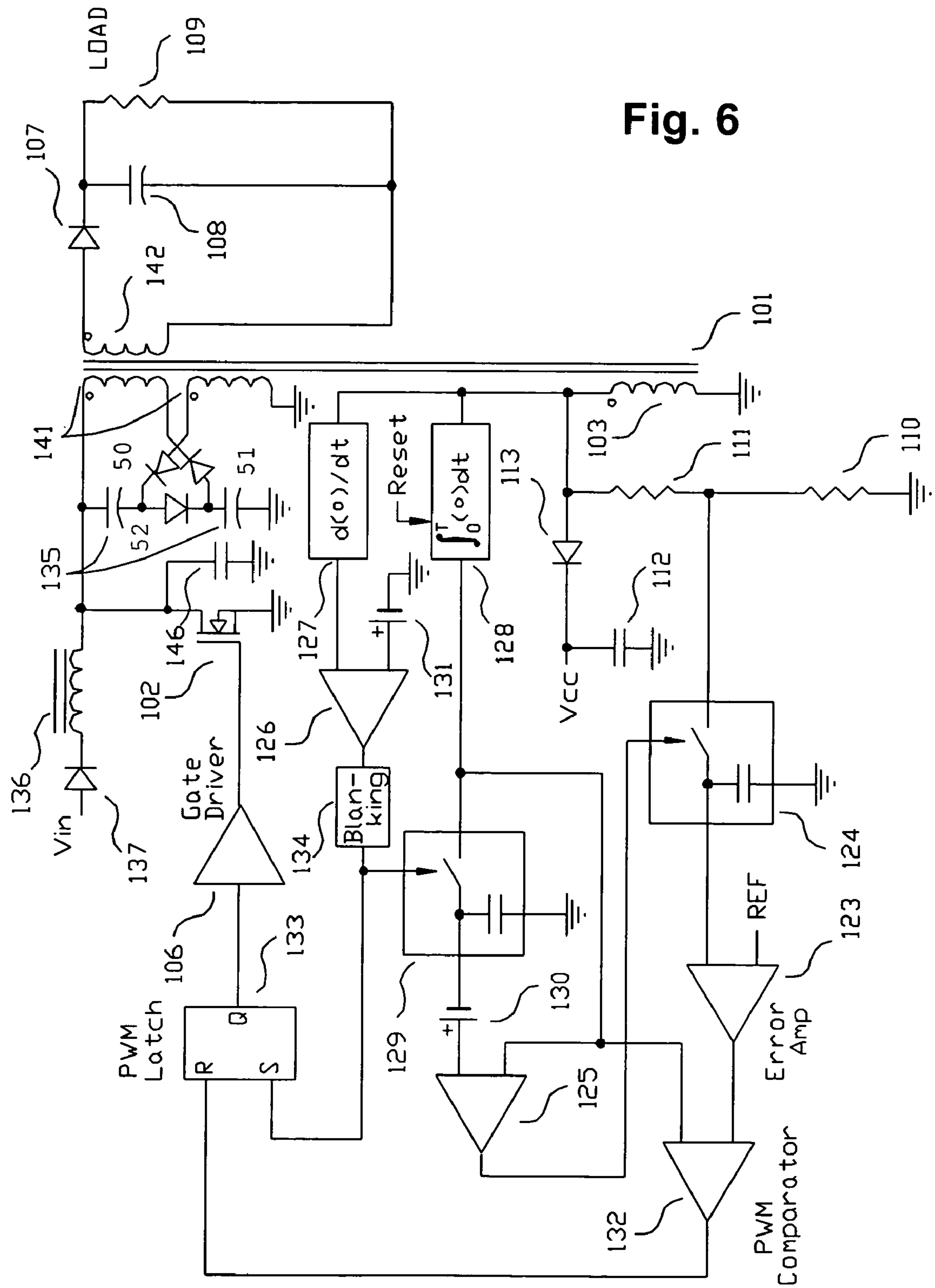
FIG. 6 is a schematic diagram of a power converter in accordance with yet another embodiment of the present invention.
Figure 7:
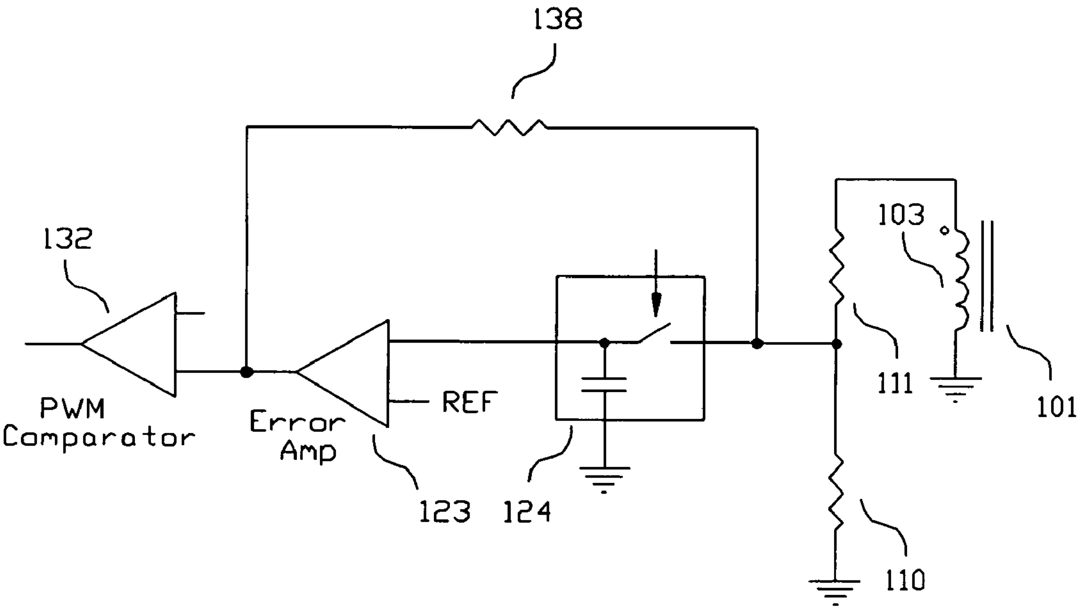
FIG. 7 is a schematic diagram depicting details of an ESR-compensated control circuit in accordance with an embodiment of the present invention.

FIG. 4 depicts a switching power converter in accordance with yet another embodiment of the present invention that is similar to the circuit of FIG. 3, but is set up to operate in critically discontinuous (boundary) conduction mode of flyback transformer 101. Unlike the power converter of FIG. 3, which operates at a constant switching frequency determined by the frequency of the Clock signal, the circuit of FIG. 4 is free running. A free running operating mode is provided by connecting the output of blanking circuit 134 to the "S" (set) input of latch 133. Operation of the circuit of FIG. 4 is illustrated in the waveform diagrams of FIG. 5. Referring to FIGS. 6 and 7, waveform 301 represents the voltage at feedback terminal 144, waveform 302 shows the output voltage of the integrator circuit, and waveform 303 shows the Reset timing of the integrator 128. The output of zero-derivative detect comparator 126 is depicted by waveform 304. Waveforms 305, 306 and 307 show the blanking 134, the integrator sample-and-hold 129 and feedback sample-and-hold 124 timings, respectively. Operation of the power converter circuit of FIG. 4 is similar to the one of FIG. 3, except that latch circuit 133 is reset by the output of blanking circuit 134. The reset occurs when comparator 126 detects a zero-derivative condition in feedback terminal 144 output voltage 301 during post-conduction resonance. Therefore, power switch 102 is turned on after one half period of the post conduction resonance at the lowest possible voltage across switch 102. The above-described "valley" switching technique minimizes power losses in switch 102 due to discharging of parasitic capacitance 146. At the same time, the transformer 101 is operated in the boundary conduction mode, since the next switching cycle always starts immediately after the entire magnetization energy is transferred to the power supply output. Operating the transformer 101 in the critically discontinuous conduction mode reduces power loss and improves the efficiency of the switching power converter of FIG. 4.

Indirect current sensing by synthesizing a voltage corresponding to magnetization current (as performed in the control circuits of FIGS. 3, 4 and 6) enables construction of single stage power factor corrected (SS-PFC) switching power converters. One example of such an SS-PFC switching power converter is shown in FIG. 6. The control circuit is identical to that of FIG. 4, only the switching and input circuits differ. Common reference designators are used in FIGS. 4 and 6 and only differences will be described below.

The power converter of FIG. 6 includes a power transformer 101 with two primary windings 141 with blocking diodes 50 and 51, two bulk energy storage capacitors 135 with a series connected diode 52, in addition to all other elements of the power converter of FIG. 4. The input voltage VIN is a full wave rectified input AC line voltage. In operation, referring to FIGS. 5 and 6, when power switch 102 is turned on at time Ton, the voltage VIN is applied across a boost inductor 136 via a diode 137, causing a linear increase in the current through inductor 136. At the same time, a substantially constant voltage from bulk energy storage capacitors 135 is applied across primary windings 141 through forward-biased diodes 50 and 51, causing transformer 101 to store magnetization energy. Diode 52 is reversed-biased during this period. Between times Ton and Toff, power switch 102 conducts a superposition of magnetization currents of the transformer 101 and boost inductor 136. Following time Toff, transformer 101 transfers its stored energy via diode 107 to capacitor 108 and load 109. Simultaneously, boost inductor 136 transfers its energy to bulk energy storage capacitors 135 via primary windings 141 and forward biased diode 52. At this time, diodes 50 and 51 are reverse-biased.

Boost inductor 136 is designed to operate in discontinuous conduction mode. Therefore, its magnetization current is proportional to the input voltage VIN, inherently providing good power factor performance, as the average input impedance has little or no reactive component. Diode 137 ensures discontinuous conduction of boost inductor 136 by blocking reverse current. A peak current mode control scheme that maintains peak current in power switch 102 in proportion to the output of voltage error amplifier 123, is not generally desirable in the power converter of FIG. 6. Since the current through power switch 102 is a superposition of the currents in boost inductor winding 136 and transformer primary windings 141, keeping the power switch current proportional to the voltage error signal tends to distort the input current waveform.

In summary, with respect to the control circuit of FIG. 6, the voltage error signal is made independent of the current in boost inductor 136, while the voltage error signal set proportional to the magnetization current in the transformer 101. Therefore, the switching power converter of FIG. 6 inherently provides good power factor performance. In addition, the above-described control circuit eliminates the need for direct current sensing. The method of the control circuit described above also provides an inherent output over-current protection when the voltage error signal is limited.

While the switching power converters of FIGS. 4 and 6 eliminate the effect of most of the parasitics in a power converter, a small error in the output voltage regulation is still present due to series resistance (ESR) of output capacitor 108. The current into the capacitor 108 is equal to (I2−Io) where I2 is current in secondary winding 142, and Io is the output current of the switching power converter. The output voltage deviation from the average output voltage can be expressed as ESR*(I2−Io), where ESR is equivalent series resistance of capacitor 108. The sampling error is represented by the deviation from the average output voltage at a time when I2 is zero. Therefore, the above-described error is equal to (−Io*ESR). FIG. 7 depicts a compensation resistor 138 connected between the output of voltage error amplifier 123 and the output of the resistive divider formed by resistors 110, 111, which can be added to the switching power converters of FIGS. 4 and 6 to cancel the above-described regulation error, since the voltage at the output of error amplifier 123 is representative of the power converter output current Io.

Figure 8:
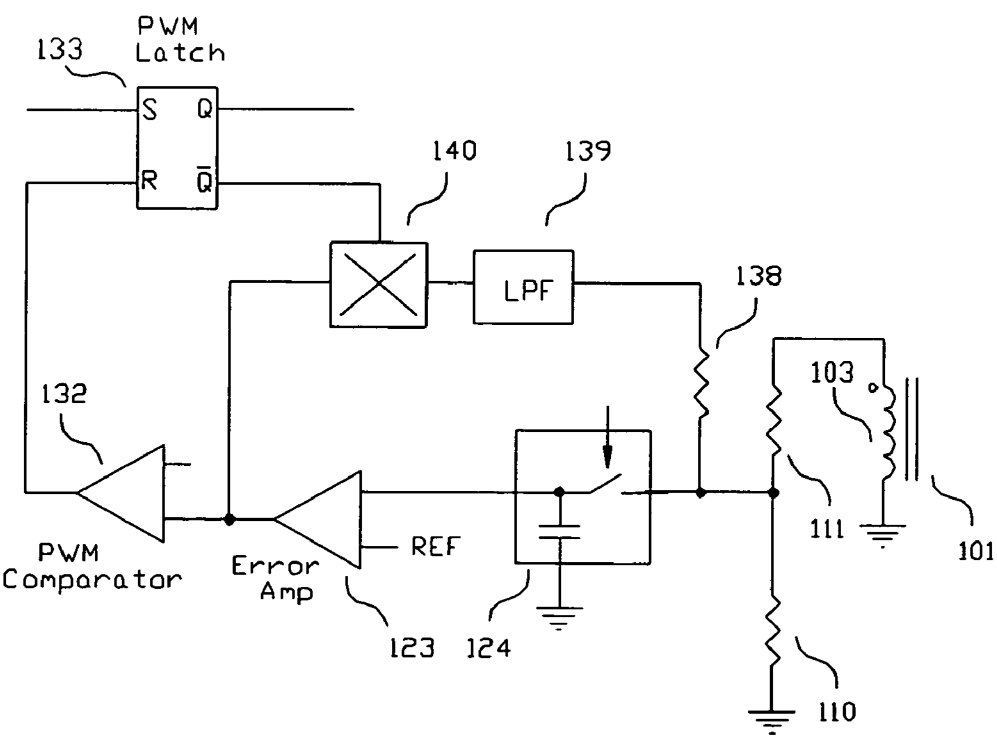
FIG. 8 is a schematic diagram depicting details of an ESR-compensated control circuit in accordance with another embodiment of the present invention.

The circuit of FIG. 7 compensates for output voltage error due to ESR of capacitor 108 for a given duty ratio of power switch 102. The value of resistor 138 is selected in inverse proportion to (1−D), where D is the duty ratio of the power switch 102. When more accurate compensation is needed, a circuit as depicted in FIG. 8 may be implemented. The circuit of FIG. 8 includes a compensation resistor 138, a low pass filter 139 and a chopper circuit 140. In operation, chopper circuit 140 corrects the compensation current of resistor 138 by factor of (1−D), chopping the output voltage of error amplifier 123 using the inverting output signal of the pulse width modulator latch 133. The switching component of the compensation signal is filtered using low pass filter 139.

The present invention introduces a new method and apparatus for controlling output voltage of magnetically coupled isolated switching power converters that eliminate a requirement for opto-feedback, current sense resistors and/or separate feedback transformers by selective sensing of magnetic flux. Further, the present invention provides high switching power converter efficiency by minimizing switching losses. The present invention is particularly useful in single-stage single-switch power factor corrected AC/DC converters due to the indirect current sensing technique of the present invention, but may be applied to other applications where the advantages of the present invention are desirable. While the illustrative examples include an auxiliary winding of a power transformer or output filter inductor for detecting magnetic flux and thereby determining a level of magnetic energy storage, the circuits depicted and claimed herein can alternatively derive their flux measurement from any winding of a power transformer or output filter inductor. Further, the measurement techniques may be applied to non-coupled designs where it may be desirable to detect the flux in an inductor that is discontinuously switched between an energizing state and a load transfer state.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A control circuit for controlling a switching power converter, wherein said switching power converter includes a power magnetic element having at least one power winding, a second winding, a switching circuit for periodically energizing said at least one power winding, wherein said control circuit controls said switching circuit, and wherein said control circuit comprises:

an integrator having an input coupled to said second winding for providing an output representing an amount of magnetic energy storage in said power magnetic element;

a comparison circuit for detecting when said output of said integrator indicates that said amount of magnetic energy storage has reached a level substantially equal to zero;

a sampling circuit having a signal input coupled to said second winding and a control input coupled to an output of said comparison circuit for sampling a voltage of said second winding in conformity with said integrator indicating that said amount of magnetic energy storage has reached said substantially zero level; and a switch control circuit having an output coupled to said switching circuit and having an input coupled to an output of said sampling circuit, whereby said switching circuit is controlled in conformity with said sampled voltage.

2. The control circuit of claim 1, further comprising:

a first detection circuit having an input coupled to said second winding for detecting a zero magnetic energy storage cycle point of a post-conduction resonance condition of said power magnetic element;

a hold circuit having an input coupled to said output of said integrator and a control input coupled to an output of said first detection circuit for holding a value of said output of said integrator at said zero magnetic energy storage cycle point;

a second detection circuit having a first input coupled to an output of said hold circuit and a second input coupled to said output of said integrator for detecting a beginning of a subsequent post-conduction resonance condition of said power magnetic element in conformity with said output of said integrator and said held value of said output of said integrator, and wherein said control input of said sampling circuit is coupled to said output of said second detection circuit, whereby said voltage of said second winding is sampled at a time preceding or equal to said beginning of said subsequent post-conduction resonance condition.

3. The control circuit of claim 2, wherein said first detection circuit comprises:

a differentiator for providing an output corresponding to a derivative of said voltage of said second winding; and a comparator for determining a time at which said derivative is substantially equal to zero, corresponding to said zero magnetic energy storage cycle point.

4. The control circuit of claim 3, wherein said comparator is biased with an offset voltage and includes hysteresis, whereby false tripping of said differentiator is prevented.

5. The control circuit of claim 4, wherein said output of said comparator is coupled to said hold circuit by a blanking circuit for enabling sampling of said integrator output only during post-conduction resonance intervals.

6. The control circuit of claim 2, wherein an output of said first detection circuit is coupled to said control circuit for activating said switching circuit at said zero magnetic energy storage cycle point, whereby efficiency of said power converter is improved.

7. The control circuit of claim 1, wherein said second winding is an auxiliary sense winding.

8. The control circuit of claim 1, wherein said integrator further comprises a reset input, and wherein said reset input is periodically activated to remove accumulated integrator error.

9. The control circuit of claim 1, wherein said integrator output is further coupled to said switch control circuit for deactivating said switching circuit when a level of magnetization current is reached in said power magnetic element corresponding to a difference between a voltage of said second winding and a reference voltage, whereby a peak current of said switching circuit is regulated.

10. The control circuit of claim 1, wherein said power magnetic element is further coupled to a load via at least one output rectifier diode and wherein said comparison circuit is biased by an offset voltage, whereby said comparison circuit detects a point offset from when said output of said integrator indicates that said amount of magnetic energy storage has reached a level equal to zero, whereby said sampling circuit samples a voltage of said second winding while said output rectifier diode is conducting a current determined in proportion with said offset voltage.

11. The control circuit of claim 1, wherein said sampling circuit further comprises a compensation circuit for adjusting an output of said sampling circuit to provide an increase in said output of said sampling circuit, whereby an effect of series resistance in a capacitor connected across an output of said power converter on an output voltage of said power converter is reduced.

12. The control circuit of claim 11, wherein said sampling circuit comprises a hold circuit having an input coupled to said second winding and an output coupled to an error amplifier for comparing a held voltage of said second winding to a reference voltage, and wherein said compensation circuit comprises a resistor coupled between an input of said hold circuit and an output of said error amplifier.

13. The control circuit of claim 11, wherein said sampling circuit comprises a hold circuit having an input coupled to said second winding and an output coupled to an error amplifier for comparing a held voltage of said second winding to a reference voltage, and wherein said compensation circuit comprises a feedback circuit including a chopper coupled between said second winding and an output of said error amplifier, and wherein a control input of said chopper is coupled to said switching control circuit for scaling a voltage of said second winding in proportion to one minus the duty ratio of the switching circuit.

14. A control circuit for controlling a switching power converter, wherein said switching power converter includes a power magnetic element having at least one power winding and a second winding, a switching circuit for periodically energizing said at least one power winding, wherein said control circuit control said switching circuit, said wherein said control circuit comprises:

a first detection circuit having an input coupled to said second winding for detecting a zero magnetic energy storage cycle point of a post-conduction resonance condition of said power magnetic element;

a second detection circuit coupled to an output of said first detection circuit for detecting a beginning of a subsequent post-conduction resonance condition of said power magnetic element in conformity with an output of said first detection circuit that indicates said detected zero magnetic energy storage cycle point;

a sampling circuit having a control input coupled to said second detection circuit for sampling a voltage of said second winding at a time preceding or equal to said beginning of said subsequent post-conduction resonance condition; and a switch control circuit having an output coupled to said switching circuit and having an input coupled to an output of said sampling circuit, whereby said switching circuit is controlled in conformity with said sampled voltage.

15. The control circuit of claim 14, wherein said first detection circuit comprises:

a differentiator for providing an output corresponding to a derivative of said voltage of said second winding; and a comparator for determining a time at which said derivative is substantially equal to zero, corresponding to said zero magnetic energy storage cycle point.

16. The control circuit of claim 15, wherein said comparator is biased with an offset voltage and includes hysteresis, whereby false tripping of said differentiator is prevented.

17. The control circuit of claim 16, wherein an output of said first detection circuit is coupled to said switch control circuit for activating said switching circuit at said zero magnetic energy storage cycle point, whereby efficiency of said power converter is improved.

18. A method of controlling a switching power converter, comprising:

periodically energizing a power magnetic storage element;

sensing magnetic flux in said power magnetic storage element via a second winding;

integrating a first voltage across said second winding to determine a second voltage corresponding to a level of magnetic energy storage in said power magnetic storage element;

comparing said second voltage to a threshold to determine a sampling time at which said level of magnetic energy storage is substantially equal to zero;

sampling said first voltage at said sampling time; and controlling subsequent energizing of said magnetic storage element in conformity with said sampled first voltage.

19. The method of claim 18, further comprising:

first detecting a zero magnetic energy storage cycle point of a post-conduction resonance condition of said power magnetic storage element in conformity with said sensed magnetic flux;

second detecting a beginning of a subsequent post-conduction resonance condition of said power magnetic element in conformity with an indication of said detected zero magnetic energy storage cycle point and a result of said integrating; and determining said sampling time preceding or equal to said beginning of said subsequent post-conduction resonance condition in conformity with said indication of said zero magnetic energy storage cycle point and further in conformity with a result of said integrating.

20. The method of claim 19, wherein said first detecting comprises:

differentiating said first voltage; and second determining when said derivative is substantially equal to zero, corresponding to said zero magnetic energy storage cycle point.

21. The method of claim 20, further comprising enabling said first detecting only during post-conduction resonance intervals.

22. The method of claim 19, further comprising initiating said energizing in response to said first detecting, wherein said energizing is commenced at said zero magnetic energy storage cycle point, whereby efficiency of said power converter is improved.

23. The method of claim 18, further comprising deactivating said switching circuit in response to a result of said integrating indicating that a level of magnetization current is reached in said power magnetic element corresponding to a difference between a voltage of said second winding at said sampling time and a reference voltage, whereby a peak current of said switching circuit is regulated.

24. A method of controlling a switching power converter, comprising:

periodically energizing a magnetic storage element;

sensing magnetic flux in said magnetic storage element via a second winding;

first detecting a zero magnetic energy storage cycle point of a post-conduction resonance condition of said power magnetic storage element in conformity with said sensed magnetic flux;

second detecting a beginning of a subsequent post-conduction resonance condition of said power magnetic element in conformity with a result of said first detecting;

sampling a voltage of said second winding at a time preceding or equal to said beginning of said subsequent post-conduction resonance condition; and controlling subsequent energizing of said magnetic storage element in conformity with said sampled voltage.

25. The method of claim 24, wherein said first detecting comprises:

differentiating said first voltage; and second determining when said derivative is substantially equal to zero, corresponding to said zero magnetic energy storage cycle point.

26. The method of claim 25 further comprising enabling said first detecting only during post-conduction resonance intervals.

27. The method of claim 24, further comprising initiating said energizing in response to said first detecting, wherein said energizing is commenced at said zero magnetic energy storage cycle point, whereby efficiency of said power converter is improved.

28. A switching power converter comprising:

a power magnetic element having at least one power winding and a second winding;

a switching circuit for periodically energizing said at least one power winding; and a control circuit, comprising:

an integrator having an input coupled to said second winding for providing an output representing an amount of magnetic energy storage in said power magnetic element, a comparison circuit for detecting when said output of said integrator indicates that said amount of magnetic energy storage has reached a level substantially equal to zero, a sampling circuit having a signal input coupled to said second winding and a control input coupled to an output of said comparison circuit for sampling a voltage of said second winding in conformity with said integrator indicating that said amount of magnetic energy storage has reached said substantially zero level, and a switch control circuit having an output coupled to said switching circuit and having an input coupled to an output of said sampling circuit, whereby said switching circuit is controlled in conformity with said sampled voltage.

29. The switching power converter of claim 28, further comprising:

an energy storage capacitor coupled to said switching circuit for maintaining a substantially DC voltage at an internal node of said switching power converter for periodically energizing said power magnetic element therefrom;

an input inductor coupled to an input of said switching power converter and further coupled to said switching circuit for shaping an input current of said switching power converter to maintain said input current proportional to an instantaneous voltage of said switching power converter input, wherein said input inductor transfers all stored energy to said energy storage capacitor during each switching period of said switching circuit, and wherein said switch control circuit controls all switches of said switching circuit so that charging of said energy storage capacitor and charging of said power magnetic element are performed alternatively under common control.

30. The switching power converter of claim 28, wherein said power magnetic element is an inductor including said second winding and coupled to an output of said switching power converter.

31. The switching power converter of claim 30, further comprising a second power magnetic element having a secondary winding coupled in series with said inductor, wherein a primary winding of said second power magnetic element is coupled to said switch, and wherein said inductor is periodically energized by said switch via said second power magnetic element.

* * * * *